United States Patent
Nelson

(10) Patent No.: US 11,725,348 B2
(45) Date of Patent: Aug. 15, 2023

(54) SYSTEM AND METHOD FOR AUTONOMOUSLY ENGAGING MATERIAL SUPPLY MACHINE WITH PAVING MACHINE

(71) Applicant: Caterpillar Paving Products Inc., Brooklyn Park, MN (US)

(72) Inventor: Ryan James Nelson, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 305 days.

(21) Appl. No.: 17/215,069

(22) Filed: Mar. 29, 2021

(65) Prior Publication Data
US 2022/0307204 A1    Sep. 29, 2022

(51) Int. Cl.
*E01C 19/00*    (2006.01)
*G05D 1/00*    (2006.01)
*G05D 1/02*    (2020.01)

(52) U.S. Cl.
CPC ......... *E01C 19/004* (2013.01); *G05D 1/0088* (2013.01); *G05D 1/0223* (2013.01); *G05D 1/0251* (2013.01); *G05D 1/0295* (2013.01); *E01C 2301/04* (2013.01); *G05D 2201/0202* (2013.01)

(58) Field of Classification Search
CPC .. E01C 19/004; G05D 1/0088; G05D 1/0223; G05D 1/0251; G05D 1/0295
See application file for complete search history.

(56) References Cited

U.S. PATENT DOCUMENTS

| | | | |
|---|---|---|---|
| 5,100,277 A | 3/1992 | Musil | |
| 5,197,848 A | 3/1993 | Musil et al. | |
| 5,921,708 A * | 7/1999 | Grundl | G05D 1/0272 |
| | | | 404/84.1 |
| 8,337,118 B2 * | 12/2012 | Buschmann | E01C 19/48 |
| | | | 404/84.1 |
| 9,481,964 B1 | 11/2016 | Marsolek | |
| 9,879,386 B2 * | 1/2018 | Marsolek | G06Q 50/08 |
| 10,001,783 B2 | 6/2018 | Zahr | |
| 10,685,564 B1 * | 6/2020 | Vrchota | G05D 1/0231 |

(Continued)

FOREIGN PATENT DOCUMENTS

EP    0667415 B1    3/1999

*Primary Examiner* — Ramsey Refai

(57) ABSTRACT

A system for controlling an engagement of a material supply machine with a paving machine is provided. The system includes one or more sensor(s) mounted on material supply machine and/or the paving machine and are configured to detect a position and distance of paving machine with respect to material supply machine. The sensor(s) further detect a relative speed between the two machines. A controller autonomously controls speed of material supply machine based on detected relative speed when distance is less than threshold. The speed of material supply machine is controlled to match speed of the paving machine. The controller also autonomously controls steering of material supply machine based on detected position of leading end of paving machine to align material supply machine with leading end of paving machine until the material supply machine engages with leading end of paving machine.

20 Claims, 7 Drawing Sheets

(56) References Cited

U.S. PATENT DOCUMENTS

| | | | |
|---|---|---|---|
| 2016/0170415 A1* | 6/2016 | Zahr | G05D 1/0293 |
| | | | 701/23 |
| 2017/0060126 A1* | 3/2017 | Marsolek | E01C 19/48 |
| 2018/0142427 A1* | 5/2018 | Tkachenko | E01C 19/004 |
| 2020/0109527 A1* | 4/2020 | McAlpine | E01C 19/23 |
| 2021/0010210 A1* | 1/2021 | Ellwein | E01C 19/004 |

* cited by examiner

SYSTEM AND METHOD FOR AUTONOMOUSLY ENGAGING MATERIAL SUPPLY MACHINE WITH PAVING MACHINE

TECHNICAL FIELD

The present disclosure relates, in general, to autonomous control of machines. More particularly, the present disclosure relates to a system and method for autonomously engaging a material supply machine with a paving machine for performing one or more paving operations.

BACKGROUND

Road construction equipment, such as paving machines, are used for constructing road surfaces by laying and pre-compacting a paving material, such as asphalt, over a work surface. Typically, a paving machine includes a hopper at a leading end for receiving paving material from a material supply machine, such as a dump truck, and a conveyor system for transferring the paving material rearwardly from the hopper to a screed assembly for discharge onto the work surface. The screed assembly smooths and compacts the paving material and, preferably, leaves a mat of generally uniform depth and smoothness.

Generally, the material supply machine, i.e., the dump truck, is backed up by an operator of the truck in a reverse direction to reach the paving machine. The dump truck then engages with the hopper at the leading end of the paving machine. After the paving machine engages with the dump truck, the operator of the truck may raise dump body of the dump truck to deliver the asphalt material to the hopper. Typically, the entire engagement process involves manual intervention of the operator and thus the operator is required to pay close attention while backing up so as to avoid contacting the hopper incorrectly or to avoid backing up too fast causing a jolt to the paving machine and a shift to the screed assembly, thereby causing a defect in the resultant mat being laid. Accordingly, such conventional engagement process is inefficient, prone to errors, and hence is undesirable.

U.S. Pat. No. 10,001,783 provides a method for controlling a work train including a self-propelled road paver and a self-propelled feeder travelling ahead of the road paver. The method includes driving the feeder by a machine operator and determining position data of the feeder. The position data refers to the position or orientation of the feeder or to components or reference points arranged on the feeder relative to a reference system and/or movement data of the feeder. The movement data describes a time-dependent change of the position data referring to the feeder. The method further includes generating travel commands for automatic travel control of the road paver in response to the movement data and/or position data of the feeder.

SUMMARY OF THE INVENTION

In one aspect, a system for controlling an engagement of a material supply machine with a paving machine for supplying paving material thereto, is provided. The system includes one or more sensors mounted on one or more of the material supply machine and the paving machine. The one or more sensors are configured to detect a position of a leading end of the paving machine and a distance of the leading end of the paving machine from the material supply machine. The sensors are also configured to detect a relative speed between the material supply machine and the paving machine. The system further includes a controller operably coupled to the one or more sensors and to a drive control system of the material supply machine. The controller is configured to autonomously control a speed of the material supply machine based on the detected relative speed when the distance of the leading end of the paving machine from the material supply machine is less than a threshold distance. The speed of the material supply machine is controlled to match a speed of the paving machine until the material supply machine engages with the leading end of the paving machine. The controller is further configured to autonomously control a steering of the material supply machine based on the detected position of the leading end of the paving machine to align the material supply machine with the leading end of the paving machine until the material supply machine engages with the leading end of the paving machine.

In another aspect of the present disclosure, a method for controlling an engagement of a material supply machine with a paving machine for supplying paving material thereto, is provided. The method includes detecting, by one or more sensors mounted on one or more of the material supply machine and the paving machine, a position of a leading end of the paving machine and a distance of the leading end of the paving machine from the material supply machine. The method further includes detecting, by the one more sensors, a relative speed between the material supply machine and the paving machine. Furthermore, the method includes autonomously controlling, by a controller operably coupled to the one or more sensors and to a drive control system of the material supply machine, a speed of the material supply machine based on the detected relative speed when the distance of the leading end of the paving machine from the material supply machine is less than a threshold distance. The speed of the material supply machine is controlled to match a speed of the paving machine until the material supply machine engages with the leading end of the paving machine. Additionally, the method includes autonomously controlling, by the controller, a steering of the material supply machine based on the detected position of the leading end of the paving machine to align the material supply machine with the leading end of the paving machine until the material supply machine engages with the leading end of the paving machine.

In a yet another aspect of the present disclosure, a material supply machine is provided. The material supply machine is configured to engage with a leading end of a paving machine for supplying paving material thereto. The material supply machine includes a machine frame, a drive control system, an implement, and a system for controlling the engagement of the material supply machine with the leading end of the paving machine. The frame supports one or more ground engaging members for propelling the material supply machine. The drive control system is configured to control the one or more ground engaging members. The drive control system includes a speed control system for controlling speed and a steering control system for controlling direction of travel of the material supply machine. The implement defines a rear end of the material supply machine, where the rear end is configured to engage with the leading end of the paving machine. The system includes one or more sensors mounted on the implement at the rear end of the material supply machine. The one or more sensors are configured to detect a position of the leading end of the paving machine and a distance of the leading end of the paving machine from the material supply machine. The sensors are further configured to detect a relative speed between the material supply machine and the paving machine. The system further includes a controller operably coupled to the one or more sensors and to the drive control system of the material supply machine. The controller is configured to send control signal to the speed control system to autonomously control the speed of the material supply machine based on the detected relative speed when the distance of the leading end of the paving machine from the material supply machine is less than a threshold distance. The speed of the material supply machine is controlled to match a speed of the paving machine until the rear end of material supply machine engages with the leading end of the paving machine. The controller is further configured to send control signal to the steering control system to autonomously control the steering of the material supply machine based on the detected position of the leading end of the paving machine to align the rear end of the material supply machine with the leading end of the paving machine until the rear end of the material supply machine engages with the leading end of the paving machine.

DETAILED DESCRIPTION

Figure 1:
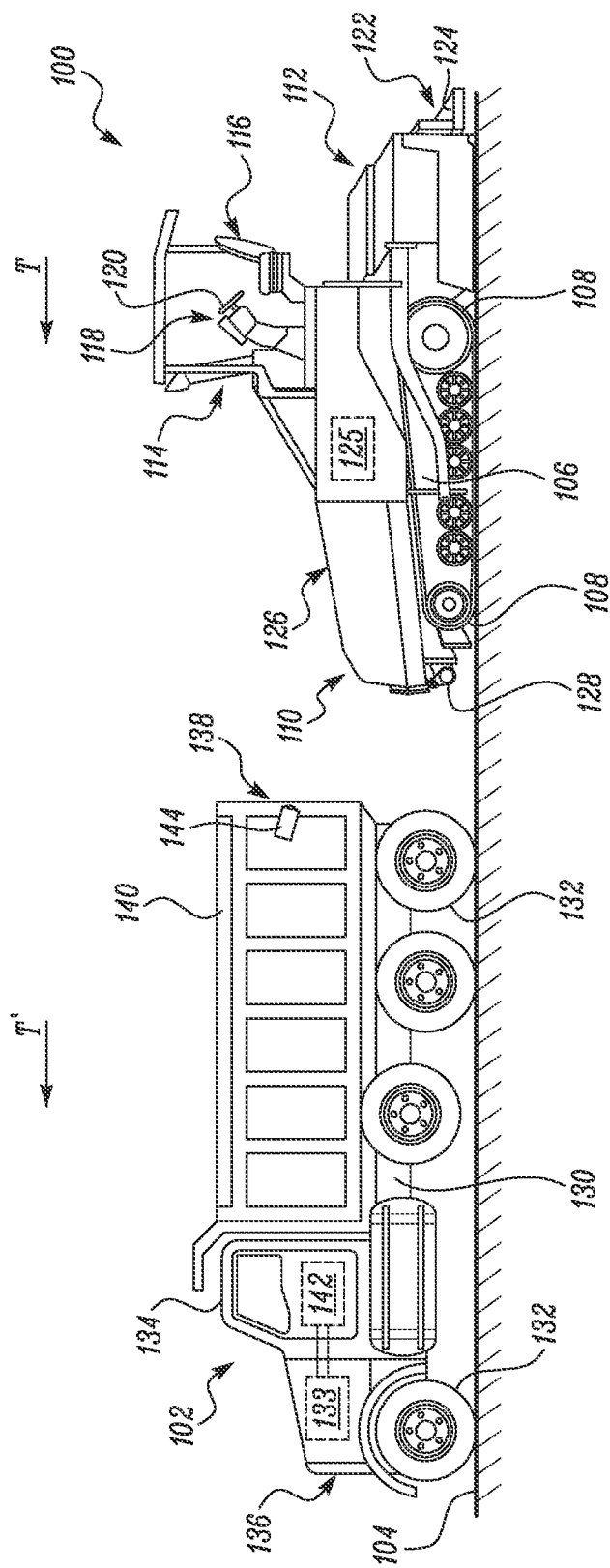
FIG. 1 illustrates an exemplary paving machine and a material supply machine operating at a worksite, according to the embodiments of the present disclosure.

The present disclosure relates to a system and method for autonomously engaging a material supply machine with a paving machine for transferring paving material thereon to perform paving operations. To this end, FIG. 1 illustrates an exemplary paving machine 100 and a material supply machine 102, such as a supply truck, configured to operate at a worksite 104 for performing one or more paving operations thereon. For example, the paving machine 100 may be embodied as an asphalt paver or any other machine used to distribute a layer of paving material, such as asphalt, on a paving surface at the worksite 104. The material supply machine 102 may be embodied as a haul truck, a dump truck or any other machine that may be used to supply the paving material to the paving machine 100. Either one or both of the machines 100 and 102 may be manned machines or unmanned machines. In some embodiments, either one or both the machines 100 and 102 may be machines having various levels of autonomy, such as fully-autonomous machines, semi-autonomous machines, or remotely operated machines.

Figure 2:
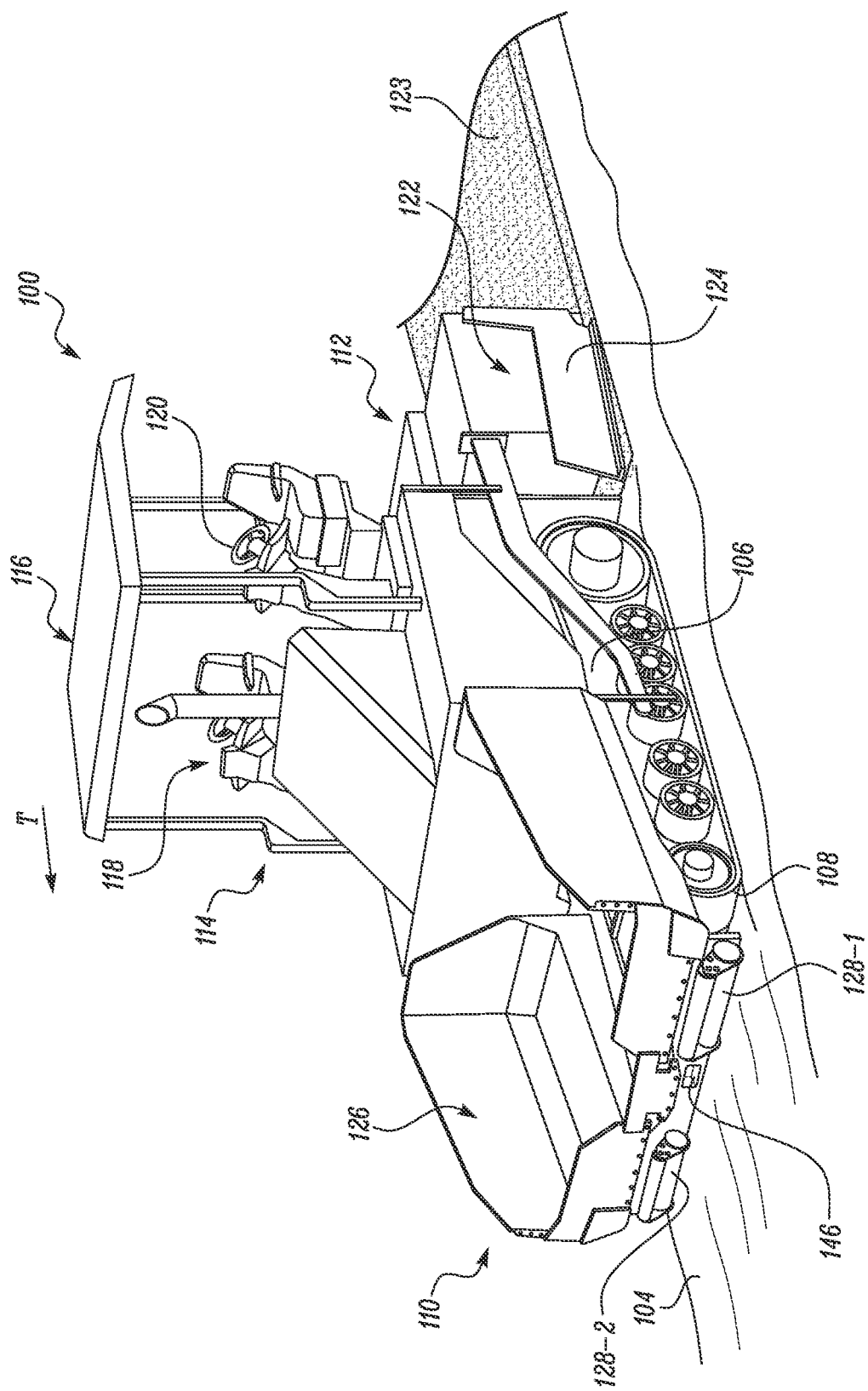
FIG. 2 illustrates an exemplary paving machine of FIG. 1.

As shown in FIGS. 1 and 2, the paving machine 100 includes a frame 106 supporting a set of ground engaging members 108, such as wheels or tracks. The frame 106 defines a leading end 110 and a trailing end 112. The terms 'leading' and 'trailing', as used herein, are in relation to a direction of travel of the paving machine 100, as represented by arrow. T, with said direction of travel being exemplarily defined from the trailing end 112 towards the leading end 110. The frame 106 of the paving machine 100 further supports a tractor portion 114 that includes a power source (not shown) and an operator station 116. The power source may be an engine, such as an internal combustion engine, configured to power operations of various systems on the paving machine 100. The operator station 116 may include an operator console 118, that may further include various controls for directing operations of the paving machine 100. For example, the operator console 118 may include one or more of a steering wheel 120, touch screens, joysticks, switches etc., to facilitate an operator in operating the paving machine 100 and its various components.

The paving machine 100 includes a screed assembly 122 at the trailing end 112. The screed assembly 122 is configured to spread and compact paving material into a layer or mat 123 (as shown in FIG. 2) of a desired width, thickness, size, and uniformity on the paving surface at the worksite 104. In an exemplary embodiment, the screed assembly 122 includes a free-floating or a self-levelling main screed 124 (hereinafter interchangeably referred to as the screed 124) coupled to the paving machine 100 via tow arms (not shown). The screed assembly 122, and more particularly the screed 124, may be raised or lowered by means of pneumatic actuators (not shown) and a desired grade (or thickness) and slope of the mat 123 may be obtained by adjusting a height and inclination/tilt, respectively, of the screed 124. The detailed working of the screed assembly 122 is generally known and is not included herein for the sake of brevity.

The paving machine 100 further includes a hopper 126 supported on the leading end 110 and configured to receive and store the paving material. A conveyor system having one or more conveyors (not shown) is further configured to move the paving material from the hopper 126 to the screed assembly 122. The paving machine 100 additionally includes a pair of push rollers 128-1, 128-2 (collectively referred to as the push roller assembly 128) attached to the hopper 126 at the leading end 110. The push roller assembly 128 may be configured to facilitate engagement of the material supply machine 102 to the leading end 110 of the paving machine 100 for transferring the paving material onto the hopper 126.

The paving machine 100 may further include a control system 125 for controlling the various components of the paving machine 100 as well as the paving operation performed over the paving surface. The control system 125 may be an onboard electronic control module (ECM) configured to interact with and control the one or more onboard components of the paving machine 100. For instance, the control system 125 may be configured to control one or more of transmission controls, screed controls, and other auxiliary controls of the paving machine 100. Although the control system 125 is shown and described to be onboard the paving machine 100, it may be contemplated that some or all the components of the control system 125 may be positioned remotely with respect to the paving machine 100.

Figure 3:
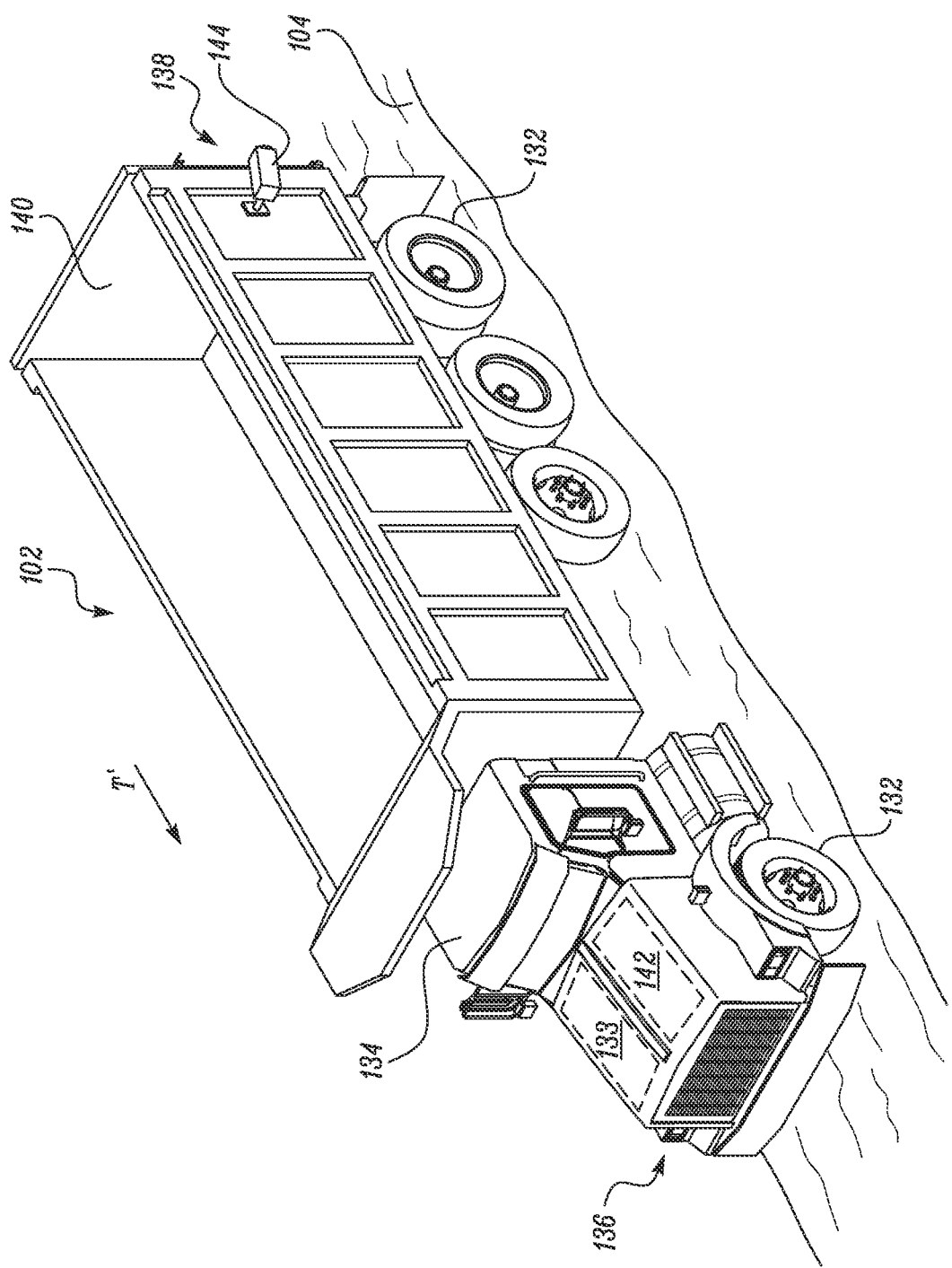
FIG. 3 illustrates an exemplary material supply machine of FIG. 1.

Referring now to FIGS. 1 and 3, the material supply machine 102 (hereinafter referred to as the supply machine 102), includes a frame 130 that supports various components of the supply machine 102, such as a set of ground engaging members 132 and an operator cabin 134. The supply machine 102 further includes a power source (not shown), such as an engine, that may be configured to power operations of various systems on the supply machine 102, such as the ground engaging members 132 via a drive control system 133. The engine may be based on one of the commonly applied power generation units, such as an internal combustion engine (ICE) having a V-type configuration, inline configuration, or an engine with different configurations, as are conventionally known.

The frame 130 defines a front end 136 and a rear end 138 of the supply machine 102. Similar to the paving machine 100, the terms 'front' and 'rear', as used herein, are in relation to a direction of travel of the supply machine 102, as represented by arrow, T', in FIG. 1, with said direction of travel being exemplarily defined from the rear end 138 towards the front end 136. The rear end 138 supports an implement 140, which performs one or more implement operations at the worksite 104. In the illustrated example, the implement 140 is embodied as a dump body, hereinafter interchangeably referred to as the dump body 140. The dump body 140 is a section in which a payload to be hauled, such as the paving material is loaded. The dump body 140 is pivotally mounted to the frame 130, such that the dump body 140 may be raised or lowered, with respect to the frame 130. The supply machine 102 may further include a number of hydraulic actuators 141 (shown in FIG. 4) that may be extended or retracted to raise or lower the dump body 140 to facilitate the one or more implement operations, such as dumping/transferring of the paving material onto the hopper 126 of the paving machine 100.

The operator cabin 134 may include an operator console (not shown), that may include various input-output controls for operating the supply machine 102 and the dump body 140. For example, the operator console may include, but not limited to, one or more of steering wheel, touch screens, display devices, joysticks, switches etc., to facilitate an operator in operating the supply machine 102 and the dump body 140. In one embodiment, the operator console may be provided on board the supply machine 102, whereas in some other embodiments, the operator console may also be positioned remotely with respect to the supply machine 102 and/or the worksite 104.

The supply machine 102 also includes its own control system 142 that is configured to control the various operations of the supply machine 102 and its various components. The control system 142 may be an onboard electronic control module (ECM) itself, that is configured to interact with and control the one or more onboard components of the supply machine 102. For instance, the control system 142 may be configured to control the drive control system 133, transmission controls, implement controls, and other auxiliary controls of the supply machine 102. Although the control system 142 is shown and described to be onboard the supply machine 102, it may be contemplated that some or all the components of the control system 142 may be positioned remotely with respect to the supply machine 102.

Figure 4:
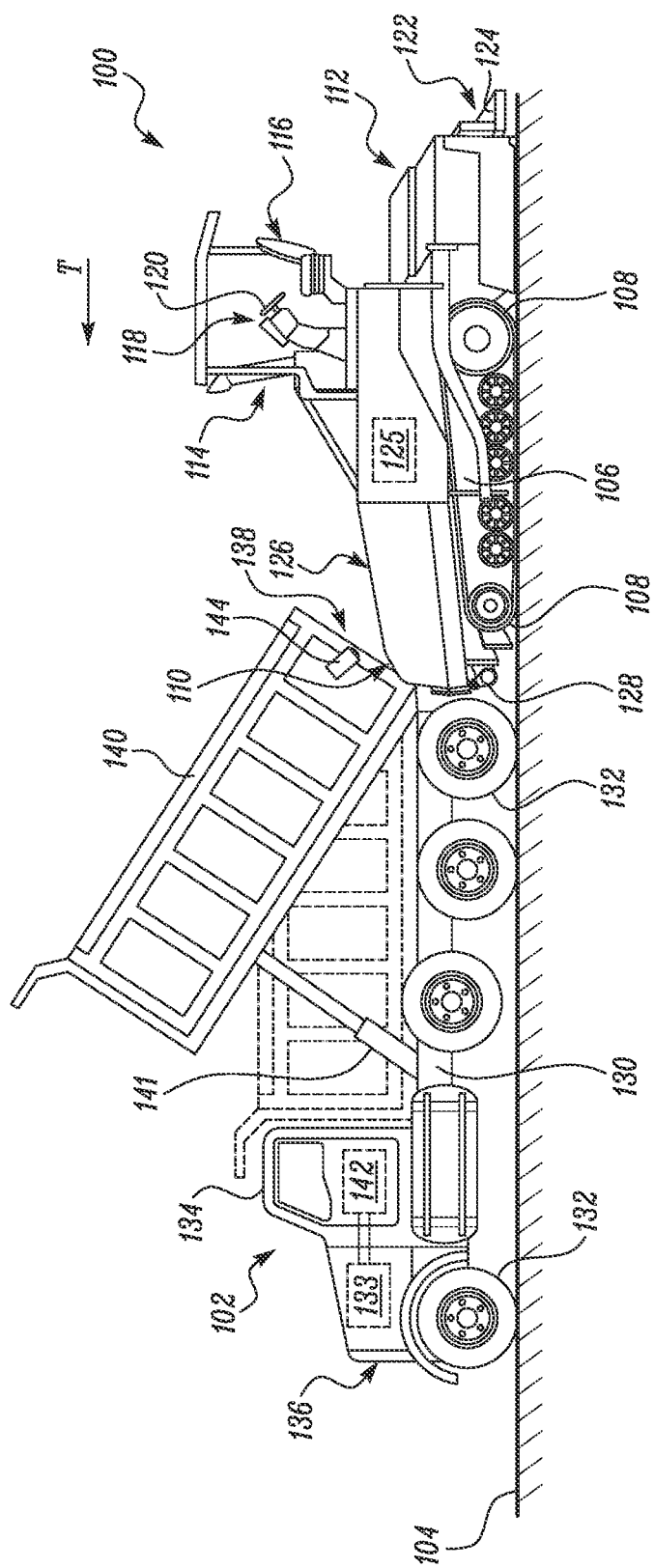
FIG. 4 illustrates an engagement of the material supply machine with the paving machine, in accordance with the embodiments of the present disclosure.

During a paving operation at the worksite 104, the paving machine 100 may be configured to receive paving material from the supply machine 102 into the hopper 126. Thus, when preparing the supply machine 102 to supply the paving material, an operator (of the supply machine 102) may be required to back/reverse the supply machine 102 towards the paving machine 100 until the supply machine 102 engages with the leading end 110 of the paving machine 100. For instance, the supply machine 102 is reversed until the ground engaging members 132 at its rear end 138 are aligned with the push roller assembly 128 on the leading end 110 of the paving machine 100. Once the supply machine 102 is aligned with the paving machine 100, the implement 140 may be tilted to a raised position to engage and unload the paving material into the hopper 126 of the paving machine 100 (as shown in FIG. 4).

Figure 5:
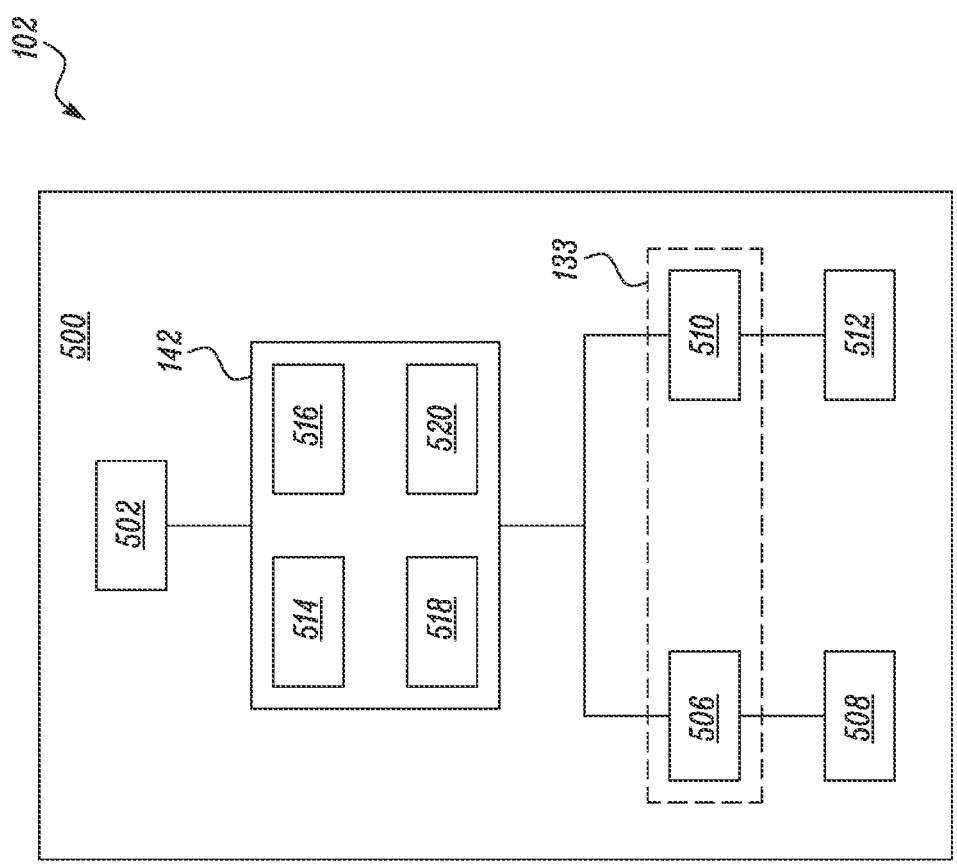
FIG. 5 illustrates a system for controlling engagement between the material supply machine and the paving machine, in accordance with the embodiments of the present disclosure.

Referring now to FIG. 5, an exemplary system 500 for autonomously controlling the engagement of the supply machine 102 with the paving machine 100 is shown. In an embodiment of the present disclosure, the system 500 may be configured to facilitate autonomous backing/reversing and steering of the supply machine 102 until it is appropriately positioned with respect to and engages with the paving machine 100. In one exemplary embodiment, the system 500 is entirely implemented on the supply machine 102 in conjunction with the onboard control system 142. In some embodiments, the system 500 may be implemented as part of the onboard control system 142 of the supply machine 102. In some alternative embodiments, the system 500 may be implemented as a separate control system that may be retrofitted on the supply machine 102 by connecting the same to the onboard control system 142.

The system 500 includes one or more sensors 502 positioned on the supply machine 102, and a control system, such as the control system 142 that is operably coupled to the one or more sensors 502 and the drive control system 133 of the supply machine 102. The drive control system 133 may include an on-board speed control system 506 for controlling the speed of the supply machine 102 and a steering control system 510 for controlling the steering and direction of travel of the supply machine 102. The speed control system 506 may include a throttle control associated with the power source 508 of the supply machine 102 and is configured to control the acceleration and/or deceleration of the supply machine 102. The steering control system 510 may include a steering column motor associated with a steering wheel 512 of the supply machine 102 and is configured to control the steering and direction of travel of the supply machine 102 at the worksite 104.

In one example, the one or more sensors 502 may be embodied as smart cameras 144 or smart vision systems mounted on the dump body 140 towards the rear end 138 of the supply machine 102, as shown in FIG. 1. As shown, the smart cameras 144 may be mounted at an appropriate position on the rear end 138 such that it has a large field of view sufficient to capture the paving machine 100 and the surroundings of the supply machine 102. In an exemplary implementation, the smart cameras 144 may be mounted on each side of the dump body 140, although only one side is shown, to cover a 360 degree view of the surroundings of the supply machine 102. Smart cameras are generally known in the art as an intelligent image capturing device that has additional capabilities of extracting application specific information from the captured images. The smart cameras or smart vision systems include a dedicated processor onboard, including video processing acceleration provided by field programmable gate array (FPGA), digital signal processor (DSP), general purpose graphics processing unit (GP-GPU), or any other suitable microprocessor with supporting application software. Additionally, the smart cameras may also include a built in communications interface, such as an Ethernet to enable communication with external devices, such as the control system 142, in this case.

Further, the control system 142 may include a memory unit 514, a controller 516, a communication module 518, and a positioning module 520. The controller 516 is in operable communication with each of the memory unit 514, the communication module 518 and the positioning module 520. The memory 514 may include a random access memory (RAM) and read only memory (ROM). The RAM may be implemented by Synchronous Dynamic Random Access Memory (SDRAM), Dynamic Random Access Memory (DRAM), and/or any other type of random access memory device. The ROM may be implemented by a hard drive, flash memory and/or any other desired type of memory device. The controller 516 may include one or more microprocessors, microcomputers, microcontrollers, programmable logic controller, DSPs (digital signal processors), central processing units, state machines, logic circuitry, or any other device or devices that process/manipulate information or signals based on operational or programming instructions. The controller 516 may be implemented using one or more controller technologies, such as Application Specific Integrated Circuit (ASIC), Reduced Instruction Set Computing (RISC) technology, Complex Instruction Set Computing (CISC) technology, etc.

The communication module 518 may be operable to communicate using any one or more suitable communications protocol and with wired and/or wireless devices or other processing entities using, for example, radio technologies, such as the IEEE 802.xx family of standards, and includes at least Wi-Fi (wireless fidelity), WiMax, and Bluetooth wireless technologies. The communication module 518 may be configured to facilitate communication of the controller 516 and the control system 142 with other control systems operational on other machines operating at the worksite 104 or with a remote control system (not shown). Communications may be made via a predefined structure as with a conventional network, such as a local area network (LAN), wide area network (WAN), hotspot, global communications network (e.g., the Internet), or may be via an ad hoc connection or communication between two or more systems. Further, the positioning module 520 may be a generally known positioning system such as a Global Positioning System (GPS) provided onboard the supply machine 102 to determine location of the supply machine 102. The general functionalities of these components of the control system 142 are well known in the art and thus not included herein for the sake of brevity of the disclosure.

In an exemplary embodiment of the present disclosure, the one or more sensors 502 may be operable alone or in connection with control system 142 to sense and/or detect a distance between the paving machine 100 and the supply machine 102. In some embodiments, the sensor(s) 502 may be operable alone or in connection with control system 142 to sense and/or detect a distance between the location where the sensor(s) 502 are mounted, such as the rear end 138 of the supply machine 102 and the leading end 110 of the paving machine 100, such as the hopper 126 or the push roller assembly 128 of the paving machine 100. However, sensor(s) 502 may be operable alone or in connection with control system 142 to sense and/or detect the distance between any suitable part of supply machine 102 and any suitable part of the paving machine 100. It may also be contemplated that in some alternative embodiments, the position data determined by the positioning module 520 of the supply machine 102 and a respective positioning module (not shown) provided on the paving machine 100 may also be used to determine the distance between the supply machine 102 and the paving machine 100.

Additionally, the sensor(s) 502 may be operable alone or in connection with control system 142 to sense and/or detect a relative speed of the supply machine 102 with respect to the paving machine 100. For instance, the sensor(s) 502 may utilize the distance between the supply machine 102 and the paving machine 100 to determine the relative speed. Alternatively, or additionally, the control system 142 may obtain the position data of the supply machine 102 from the positioning module 520 to determine the relative speed of the supply machine 102 with respect to the paving machine 100.

The sensor(s) 502 may be further operable alone or in connection with control system 142 to detect a position of the leading end 110 of the paving machine 100. For instance, the sensor(s) 502 embodied as the smart cameras 144, may utilize image processing and edge detection techniques to identify the precise position and/or an outline of the leading end 110 of the paving machine 100. Such image processing and edge detection techniques to detect an outline of an object in an image are well known in the art and hence not described herein for the sake of brevity of the disclosure. In an exemplary embodiment of the present disclosure, the sensor(s) 502 may be configured to determine a precise position of the hopper 126 and the push roller assembly 128 at the leading end 110 of the paving machine 100. Alternatively, the sensor(s) 502 may be embodied as such as a Light Detection and Ranging (LiDAR) sensors that may use other known techniques to identify the precise position of the leading end 110 of the paving machine 100 may also be utilized without deviating from the scope of the claimed subject matter.

Figure 6:
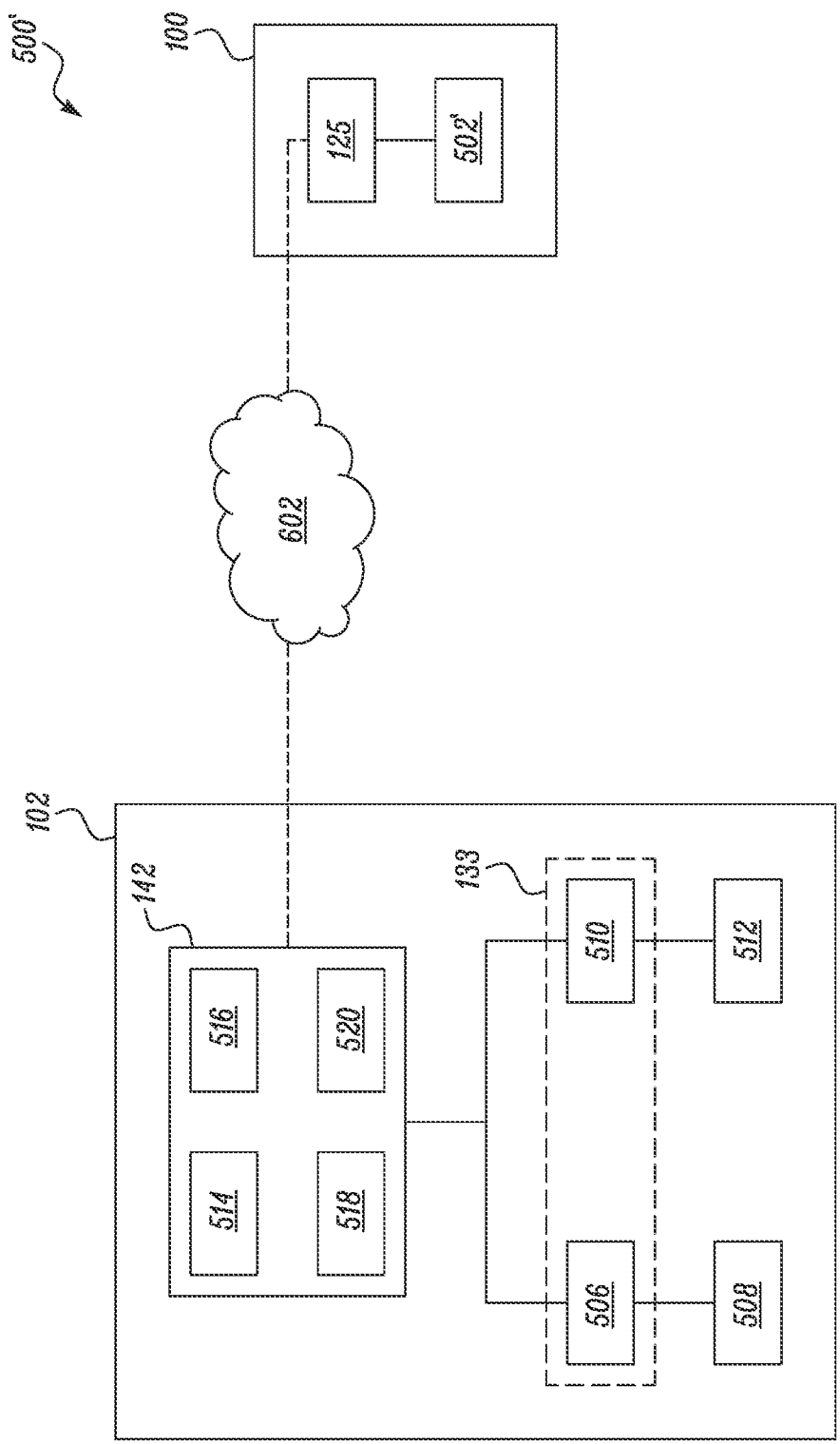
FIG. 6 illustrates a system for controlling engagement between the material supply machine and the paving machine, in accordance with an alternative embodiment of the present disclosure.

In an alternative embodiment as illustrated in FIG. 6, the system 500' may include only one sensor 502' mounted on the leading end 110 of the paving machine 100. In this example, the sensor 502' may also be embodied as a smart camera 146 mounted in a cavity within the push roller assembly 128 of the paving machine 100 (as shown in FIG. 2). The sensor 502' may be configured to detect a position of the leading end 110 of the paving machine 100, the position of the rear end 138 of the supply machine 102, and a distance between the two and the relative speed in a similar manner as described above for the sensor(s) 502. In such an implementation, the sensor(s) 502' may be configured to provide the detected information to the control system 125 onboard the paving machine 100 which in turn communicates the same wirelessly to the control system 142 of the supply machine 102 over a network 602 for further processing. Although the one or more sensors 502, 502' are shown and described to be smart cameras, it may be contemplated that other types of sensors, such as the LiDAR sensor using laser detection and reflection techniques to determine distance, position, and relative speed, may also be used without deviating from the scope of the claimed subject matter.

Referring now collectively to FIGS. 5 and 6, during operation, when the supply machine 102 is required to supply and transfer the paving material to the paving machine 100, the operator of the supply machine 102 may start to reverse and decelerate the supply machine 102 along a desired path towards the paving machine 100. As the supply machine 102 reaches closer to the paving machine 100, the controller 516 may be configured to determine when the distance of the leading end 110 of the paving machine 100 from the supply machine 102 and/or the sensor(s) 502 is less than a threshold distance. For instance, when the operator activates a reverse transmission gear on the supply machine 102, the controller 516 may transmit an activation signal to the sensor(s) 502 or to the sensor 502' via the control system 125, to determine the distance and position of the leading end 110 of the paving machine 100 with respect to the supply machine 102. In some embodiments, the controller 516 may additionally or alternatively receive an operator input to switch the supply machine 102 into an autonomous mode when backing towards the paving machine 100 and may be configured to activate the sensor(s) 502 upon receiving the operator input.

The controller 516 may be configured to take over the control of the supply machine 102, such as the drive control system 133, to autonomously control the speed of the supply machine 102 when the distance between the supply machine 102 and the paving machine 100 falls below the threshold value. The speed of the supply machine 102 is controlled to match a speed of the paving machine 100 to slowly engage the supply machine 102 with the paving machine 100 without causing any jolt or significant impacts to the paving machine 100 and the screed assembly 122. For example, when the paving machine 100 and supply machine 102 are determined to be within ten feet or less, or particularly within five feet or less, or even within between one to three feet or less, the controller 516 of the control system 142 automatically takes control of the drive control system 133 and controls the speed (i.e., the acceleration and deceleration) of the supply machine 102 to further close the distance between the paving machine 100 and the supply machine 102. Alternatively, the controller 516 may start autonomously controlling the speed of the supply machine 102 when the operator input to switch the supply machine 102 into an autonomous mode is received. For instance, the controller 516 may be configured to send control signals to the throttle control of speed control system 506 to control the acceleration and/or deceleration of the supply machine 102. In some implementations, the speed of the supply machine 102 is nearly matched to that of the paving machine 100 such that the relative speed between the two is, in some embodiments, less than or equal to about three miles per hour, and in other embodiments, less than or equal to about two miles per hour, and in still further embodiments, less than or equal to about one mile per hour.

In some exemplary embodiments of the present disclosure, the system 500 may also include a machine learning model implemented within the control system. The distance, the speed of both the machines 100, 102, and relative speed between the paving machine 100 and the supply machine 102 may be recorded over time and provided as a training corpus to the machine learning model. The machine learning model may determine a correlation between the distance, speed, and the relative speed to determine an optimum speed at which the supply machine 102 may move and engage with the paving machine 100 so as to minimize the impact. A feedback may also be provided to the machine learning model indicating the resultant impact on the paving machine 100 as well as the screed assembly 122 to retrain the machine learning model. Other feedback may also be recorded, such as the time taken to engage the supply machine 102 with the paving machine 100 at a certain speed, to further optimize the speed at which the supply machine 102 may be moved to engage with the paving machine 100.

The controller 516 is further operable to determine the position and/or orientation of the supply machine 102 with respect to the detected position of the leading end 110 of the paving machine 100. For instance, the controller 516 may obtain the images or data regarding the surrounding from the smart cameras 144, 146 determine the position of the supply machine 102 with respect to the paving machine 100. In some alternative embodiments, the controller 516 may also utilize the position data obtained from the positioning module 520 to determine the position of the supply machine 102. More specifically, the controller 516 may be configured to determine a position or orientation of the dump body 140 at the rear end 138 of the supply machine 102 with respect to the hopper 126 and the push roller assembly 128 provided on the leading end 110 of the paving machine 100.

In an embodiment of the present disclosure, the controller 516 is further configured to autonomously control a steering of the supply machine 102 based on the detected position and outline of the leading end 110 of the paving machine 100. For instance, the controller 516 may send control signals to the steering control system 510 to control the steering wheel 512 for steering the supply machine 102 while reversing so as to align the rear end 138 of the supply machine 102 with the leading end 110 of the paving machine 100. In an exemplary implementation, the controller 516 may be configured to steer the supply machine 102 such that the dump body 140 and the ground engaging members 132 at the rear end 138 of the supply machine 102 align with the hopper 126 and the push roller assembly 128, respectively, provided at the leading end 110 of the paving machine 100.

Once the supply machine 102 reaches sufficiently close to the paving machine 100 and when the dump body 140 and the ground engaging members 132 at the rear end 138 are aligned with the hopper 126 and the push roller assembly 128 on the leading end 110 of the paving machine 100, the operator of the supply machine 102 may switch to neutral gear, thereby permitting the paving machine 100 to push the supply machine 102 while engaging therewith. Thereafter, the operator of the supply machine 102 may raise the dump body 140, as illustrated in FIG. 4, to deliver the paving material to the hopper 126 of the paving machine 100. In some other embodiments, the control system 142 of the supply machine 102 may automatically control raising and/or lowering of the dump body 140 by controlling the hydraulic actuators 141. Also following contact between the paving machine 100 and supply machine 102, any other conventional operations of paving machine and material supply machine may be performed.

While the present disclosure is provided with respect to the supply machine 102 being autonomously controlled, a person skilled in the art will understand that in an alternative embodiment, the system 50) may also be implemented to autonomously control the speed of the paving machine 100 and steer the paving machine 100 to align with the supply machine 102, in a similar manner. In a yet another embodiment, the system 500 may be implemented on both the machines 100, 102 to control the speed and steering of both the machines.

INDUSTRIAL APPLICABILITY

The system 500, 500' of the present disclosure facilitate autonomous engagement of the supply machine 102 with the paving machine 100 for supplying the paving material thereto. The system 500, 500' facilitates autonomous controlling of the speed and steering of the supply machine 102 such that when the supply machine 102 engages with the paving machine 100, there is no significant impact felt on the paving machine 100 and there is no impact on the screed assembly 122. Furthermore, the autonomous steering control also facilitates accurate alignment of the rear end 138 of the supply machine 102 with the leading end 110 of the paving machine 100, thereby eliminating the risk of incorrect contact with the hopper 126 and causing a shift to the screed assembly 122 and damage to the mat 123 being laid.

Figure 7:
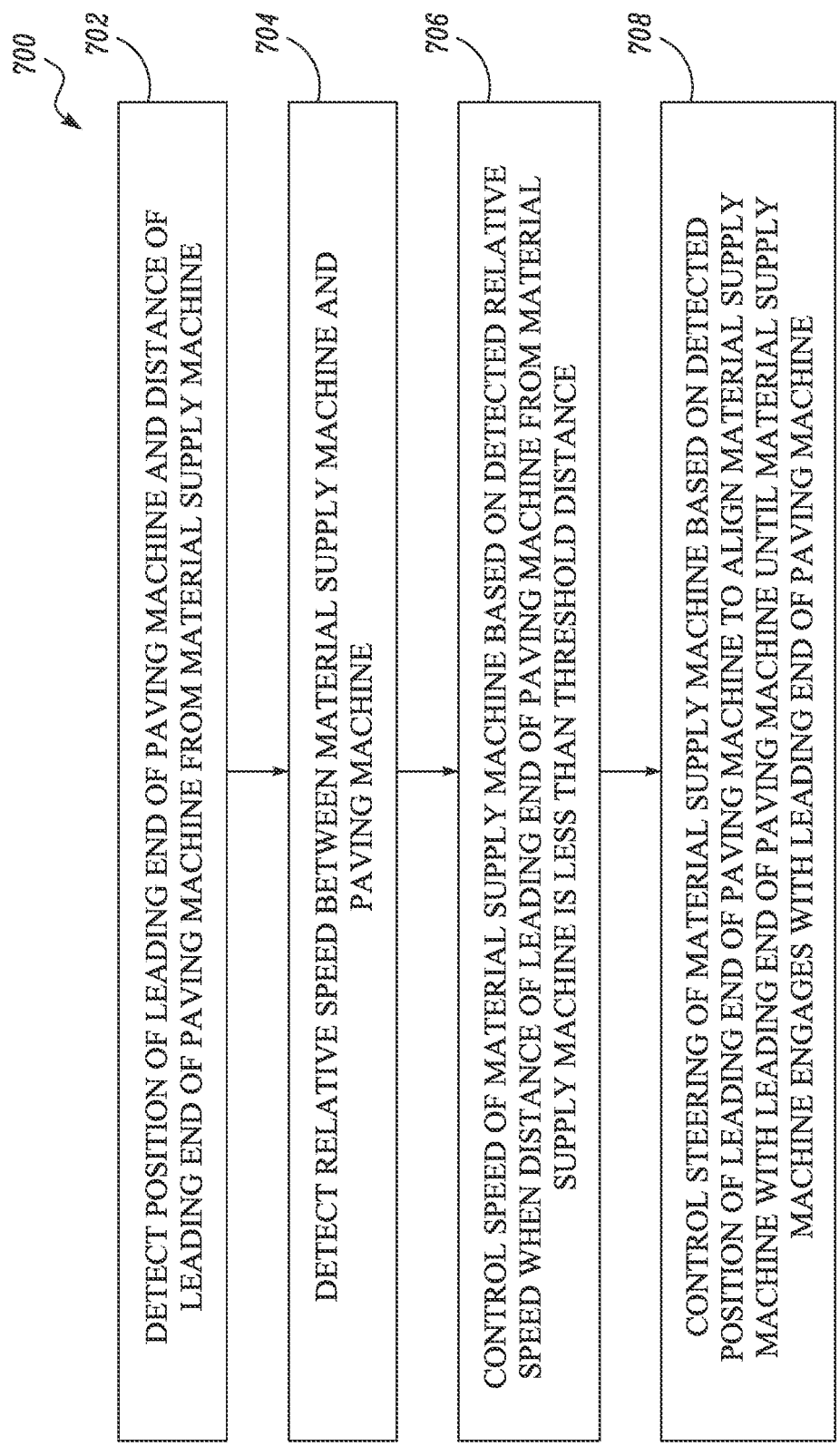
FIG. 7 illustrates an exemplary method for controlling engagement between the material supply machine and the paving machine, in accordance with the embodiments of the present disclosure.

FIG. 7 illustrates an exemplary method 700 for autonomously engaging the supply machine 102 with the paving machine 100 to supply paving material thereto. In an exemplary embodiment, the method 700 is performed by the system 500, 500' which may be implemented as part of the onboard control system 142 of the supply machine 102 or may be retrofitted thereon.

At step 702, a position of the leading end 110 of the paving machine 100 and a distance of the same from the supply machine 102 are detected. As explained previously, the sensors 502, 502' may be configured to detect the position (or an outline) of the leading end 110 (including the hopper 126 and the push roller assemblies 128) of the paving machine 100. The sensors 502, 502' may also detect a position of the supply machine 102 (more specifically the rear end 138 of the supply machine 102) with respect to the leading end 110 of the paving machine 100. Similarly, the sensors 502, 502' either alone or in combination with the controller 516, may detect the distance of the rear end 138 of the supply machine 102 with respect to the leading end 110 of the paving machine 100. Examples of the sensor(s) 502, 502' may include, but not limited to, smart cameras, smart vision systems, LiDAR sensors, etc.

At step 704, a relative speed between the supply machine 102 and the paving machine 100 is detected. For instance, the sensor(s) 502, 502' either alone or in combination with the controller 516, may detect the relative speed of the supply machine 102 with respect to the paving machine 100 based on the determined distance between the two. Alternatively, the controller 516 may use position information of the supply machine 102 as well as the paving machine 100 to determine the relative speed.

In an embodiment of the present disclosure, when the distance between the supply machine 102 and the paving machine 100 determined at step 702 goes below the threshold value, the controller 516 takes control of the drive control system 133 of the supply machine 102. Alternatively, the controller 516 may start autonomously controlling the drive control system 133 in response to an operator input indicating switch into autonomous mode of the supply machine 102.

Further, at step 706, the speed of the supply machine 102 is autonomously controlled by the controller 516 when the distance determined at step 704 falls below a threshold distance. For example, the controller 516 takes over the control of the drive control system 133 of the supply machine 102. Thus, the controller 516 may control the speed control system 506 to adjust the deceleration of the supply machine 102 to match the speed of the paving machine 100 until the supply machine 102 engages with the leading end 110 of the paving machine 100.

Furthermore, at step 708, the steering of the supply machine 102 is autonomously controlled based on the detected position of the leading end 110 of the paving machine 100. For example, the supply machine 102 is autonomously controlled to steer appropriately so as to align the rear end 138 of the supply machine 102 with the leading end 110 of the paving machine 100. In an embodiment, the controller 516 takes over control of the steering control system 510 to control the steering wheel 512 until the rear end 138 is accurately aligned with the leading end 110 of the paving machine 100.

Once the supply machine 102 reaches sufficiently close to the paving machine 100 and when the rear end 138 is accurately aligned with the hopper 126 and the push roller assembly 128 on the leading end 110 of the paving machine 100, the operator of the supply machine 102 may be engaged with the paving machine 100. Thereafter, the operator of the supply machine 102 may raise the dump body 140 to deliver the paving material to the hopper 126 of the paving machine 100.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A system for controlling an engagement of a material supply machine with a paving machine for supplying paving material thereto, the system comprising:
   one or more sensors mounted on one or more of the material supply machine and the paving machine, the one or more sensors being configured to:
   detect a position of a leading end of the paving machine and a distance of the leading end of the paving machine from the material supply machine; and
   detect a relative speed between the material supply machine and the paving machine; and
   a controller operably coupled to the one or more sensors and to a drive control system of the material supply machine, the controller being configured to:
   autonomously control a speed of the material supply machine based on the detected relative speed when the distance of the leading end of the paving machine from the material supply machine is less than a threshold distance, the speed of the material supply machine being controlled to match a speed of the paving machine until the material supply machine engages with the leading end of the paving machine; and
   autonomously control a steering of the material supply machine based on the detected position of the leading end of the paving machine to align the material supply machine with the leading end of the paving machine until the material supply machine engages with the leading end of the paving machine.

2. The system of claim 1, wherein the one or more sensors include a sensor mounted on the leading end of the paving machine.

3. The system of claim 1, wherein the one or more sensors include a sensor mounted on a rear end of the material supply machine.

4. The system of claim 1, wherein the one or more sensors include a smart camera mounted on one or more of the material supply machine and the paving machine.

5. The system of claim 1, wherein the one or more sensors include a Light Detection and Ranging (Lidar) sensor mounted on one or more of the material supply machine and the paving machine.

6. The system of claim 1, wherein the one or more sensors is configured to detect an outline of the leading end of the paving machine, the leading end including a hopper and push roller assembly for engaging with the material supply machine.

7. The system of claim 6, wherein the controller is configured to control the steering of the material supply machine to align a rear end of the material supply machine with the detected outline of the leading end of the paving machine until the rear end of the material supply machine engages with the leading end of the paving machine.

8. A method for controlling an engagement of a material supply machine with a paving machine for supplying paving material thereto, the method comprising:
- detecting, by one or more sensors mounted on one or more of the material supply machine and the paving machine, a position of a leading end of the paving machine and a distance of the leading end of the paving machine from the material supply machine;
- detecting, by the one more sensors, a relative speed between the material supply machine and the paving machine;
- autonomously controlling, by a controller operably coupled to the one or more sensors and to a drive control system of the material supply machine, a speed of the material supply machine based on the detected relative speed when the distance of the leading end of the paving machine from the material supply machine is less than a threshold distance, the speed of the material supply machine being controlled to match a speed of the paving machine until the material supply machine engages with the leading end of the paving machine; and
- autonomously controlling, by the controller, a steering of the material supply machine based on the detected position of the leading end of the paving machine to align the material supply machine with the leading end of the paving machine until the material supply machine engages with the leading end of the paving machine.

9. The method of claim 8, wherein the one or more sensors include a sensor mounted on the leading end of the paving machine.

10. The method of claim 8, wherein the one or more sensors include a pair of sensors mounted on a rear end of the material supply machine.

11. The method of claim 8, wherein the one or more sensors include a smart camera mounted on one or more of the material supply machine and the paving machine.

12. The method of claim 8, wherein the one or more sensors include a Light Detection and Ranging (Lidar) sensor mounted on one or more of the material supply machine and the paving machine.

13. The method of claim 8, wherein detecting the position of the leading end of paving machine further includes detecting, by the one or more sensors, an outline of the leading end of the paving machine, the leading end including a hopper and push roller assembly for engaging with the material supply machine.

14. The method of claim 13, wherein controlling the steering includes controlling, by the controller, the steering of the material supply machine to align a rear end of the material supply machine with the detected outline of the leading end of the paving machine until the rear end of the material supply machine engages with the leading end of the paving machine.

15. A material supply machine for engaging with a leading end of a paving machine for supplying paving material thereto, the material supply machine comprising:
- a machine frame supporting one or more ground engaging members for propelling the material supply machine;
- a drive control system configured to control the one or more ground engaging members, the drive control system including a speed control system for controlling speed and a steering control system for controlling direction of travel of the material supply machine;
- an implement defining a rear end of the material supply machine, the rear end being configured to engage with the leading end of the paving machine, and
- a system for controlling the engagement of the material supply machine with the leading end of the paving machine, the system comprising:
  - one or more sensors mounted on the implement at the rear end of the material supply machine, the one or more sensors being configured to:
    - detect a position of the leading end of the paving machine and a distance of the leading end of the paving machine from the material supply machine; and
    - detect a relative speed between the material supply machine and the paving machine; and
  - a controller operably coupled to the one or more sensors and to the drive control system of the material supply machine, the controller being configured to:
    - send control signal to the speed control system to autonomously control the speed of the material supply machine based on the detected relative speed when the distance of the leading end of the paving machine from the material supply machine is less than a threshold distance, the speed of the material supply machine being controlled to match a speed of the paving machine until the rear end of material supply machine engages with the leading end of the paving machine; and
    - send control signal to the steering control system to autonomously control the steering of the material supply machine based on the detected position of the leading end of the paving machine to align the rear end of the material supply machine with the leading end of the paving machine until the rear end of the material supply machine engages with the leading end of the paving machine.

16. The material supply machine of claim 15, wherein the one or more sensors include a smart camera mounted on one or more of the material supply machine and the paving machine.

17. The material supply machine of claim 15, wherein the one or more sensors include a Light Detection and Ranging (Lidar) sensor mounted on one or more of the material supply machine and the paving machine.

18. The material supply machine of claim 15, wherein the one or more sensors is configured to detect an outline of the leading end of the paving machine, the leading end including a hopper and push roller assembly for engaging with the material supply machine.

19. The material supply machine of claim 18, wherein the controller is configured to control the steering of the material supply machine to align the rear end of the material supply machine with the detected outline of the leading end of the paving machine until the trailing end of the material supply machine engages with the leading end of the paving machine.

20. The material supply machine of claim 15 including an onboard control module and wherein the system for controlling the engagement of the material supply machine with the leading end of the paving machine is a retrofittable system having the controller being configured to send control signal to the speed control system and the steering control system via the onboard control module.

* * * * *